(12) United States Patent
Oberbeck et al.

(10) Patent No.: US 7,468,165 B2
(45) Date of Patent: Dec. 23, 2008

(54) MICROREACTOR SYSTEM

(76) Inventors: Sebastian Oberbeck, Schmittbachweg 17, Weilburg (DE) 35781; Volker Autze, Berger Strasse 314, Frankfurt am Main (DE) 60385; Klaus Golbig, In den Rohrwiesen 4a, Harxheim (DE) 55296

( * ) Notice: Subject to any disclaimer, the term of this patent is extended or adjusted under 35 U.S.C. 154(b) by 873 days.

(21) Appl. No.: 10/494,725

(22) PCT Filed: Oct. 21, 2002

(86) PCT No.: PCT/EP02/11763
§ 371 (c)(1),
(2), (4) Date: Aug. 18, 2004

(87) PCT Pub. No.: WO03/039736
PCT Pub. Date: May 15, 2003

(65) Prior Publication Data
US 2005/0025677 A1    Feb. 3, 2005

(51) Int. Cl.
*B01J 19/00* (2006.01)
*B01L 11/00* (2006.01)
*G01N 31/00* (2006.01)

(52) U.S. Cl. ............... 422/130; 422/63; 422/103

(58) Field of Classification Search ............ 422/63, 422/103, 130
See application file for complete search history.

(56) References Cited

U.S. PATENT DOCUMENTS

| | | | | |
|---|---|---|---|---|
| 5,580,523 A | * | 12/1996 | Bard | 422/50 |
| 6,240,790 B1 | * | 6/2001 | Swedberg et al. | 73/863.21 |
| 2004/0074084 A1 | * | 4/2004 | Pieper et al. | 29/739 |

FOREIGN PATENT DOCUMENTS

| | | | |
|---|---|---|---|
| DE | 196 52 823 A1 | | 3/1998 |
| DE | 101 06 996 A1 | | 9/2002 |
| EP | 1 031 375 A2 | | 8/2000 |
| WO | WO 95/26796 | | 10/1995 |
| WO | WO00/62918 | | 10/2000 |
| WO | WO02064247 | * | 8/2002 |

* cited by examiner

*Primary Examiner*—Glenn Caldarola
*Assistant Examiner*—Lessanework T Seifu
(74) *Attorney, Agent, or Firm*—Norris McLaughlin & Marcus PA

(57) ABSTRACT

The invention related to a microreactor system for the continuous synthesis, which provides defined reaction chambers and conditions for said synthesis, as well as to the uses of said microreactor in carrying out a chemical reaction. According to said invention, (a) said mircoreactor system (11) is of modular design, (b) a processing unit (10) is made up of processing modules which are connected to each other by frictional engagement and (c) the fluid connections in said processing unit (10) can be obtained by the frictional connection of said processing modules.

31 Claims, 4 Drawing Sheets

MICROREACTOR SYSTEM

The invention relates to a micro-reactor system for the continuous synthesis with the features recited in the preamble of claim 30.

BACKGROUND

A successful chemical synthesis—in both inorganic and organic chemistry—requires strict adherence to numerous reaction conditions. For example, the temperature, the concentration of the reactants, their retention time and hence the reaction time in the reactor, the pressure and the medium in which the reaction is to take place, have to be optimized in order to obtain the highest possible yield, while also taking into consideration their cost-effectiveness. The reaction mixture must almost always be post-processed for purifying the reaction products. If the individual processing steps are performed in a stationary reactor system, then a number of processing steps are required during the synthesis which typically have to be carried out manually, which is time-consuming and requires additional personnel. Stationary or semi-stationary syntheses (in batch or semi-batch reactors) have the disadvantage that the operating parameters derived from a known system cannot always be applied to a larger starting batch. The larger starting batch must frequently be optimized from the start, for example, due to problems associated with dissipation of the reaction heat. One solution is provided by so-called continuous synthesis processes, where the reactants are introduced into a transportable medium, where they react with each other, with a product being withdrawn at another location—optionally after additional processing steps. Such systems have so far been mainly employed in large-scale industrial operations that produce basic chemical materials.

The starting batches in laboratory-scale experiments or in the production of special pharmaceutical products are mostly too small to perform the syntheses common in large plants. During the past years, micro-reactor systems have been developed that advantageously employ a continuous process flow, while being configured for a much smaller total throughput. The micro-reactors offer a defined reaction space which frequently includes additional structural elements that affect the reaction conditions. For example, EP 1 031 375 A2 discloses a micro-reactor for carrying out chemical reactions that has individual, freely exchangeable micro-structured elements. Micro-reactors of the aforedescribed type can advantageously carry out process syntheses under continuous synthesis conditions, which thus far have been known only from large-scale facilities. The thermal aspect of the reaction can be controlled with hitherto unmatched precision, because the walls between the passageways transporting the reaction medium and a heat exchange medium can frequently be made very thin. The small volumes, where very small material quantities can react with each other, allow a very safe process control, in particular when carrying out critical or dangerous syntheses.

Such micro-reactors have in common that they can consist of individual processing modules designed for different tasks. The processing modules provide defined reaction spaces where the reactants are mixed and react with each other by thermal initiation or control. Additional processing modules retain the reaction medium and allow post-processing by, for example, extraction, phase separation or annealing. The individual processing modules must be in fluid communication with each other.

A micro-reactor system is described in WO 95/26796 to Bard et al., which is based on the aforedescribed modular concept. The individual processing modules are mounted on the side of a support structure. The support structure includes small channels that provide a fluid connection between the individual processing modules of the micro-reactor. For example, a reactor module, a separation module and an analyzer module are sequentially arranged on the support structure. The connecting channels of the disclosed micro-reactor system are disadvantageously fixedly integrated in the support structure, representing a fixed connection system. This limits the flexibility of the micro-reactor system which hence cannot be adapted to the often different requirements of the chemical synthesis.

Ehrfeld et al. (WO 00/62018) describe a micro-reactor system that is composed of individual processing modules. The individual processing modules are provided with connecting elements via a connection system. The connecting elements are non-positively connected during assembly in such a way that fluid channels leading from one processing module to the next are connected with each other so as to form a seal to the outside. Connecting elements are considered to be formfittingly connected when they represent an integral part of the modules. A distinction is made between formfitting and non-positive connections. With the first type of connections, the force is transmitted as a result of their form or shape, whereas with the latter type of connections, the force is transmitted through friction forces (K. H. Decker: "Machine Elements—Design and Computation), $10^{th}$ printing, Carl Hanser Verlag, Vienna, 1990, p. 212). This publication does not suggest the integration of sensors and actuators in the system which is required for regulation and control.

SUMMARY

It is therefore an object of the invention to provide a micro-reactor system that is made of easily exchangeable processing modules and that includes a very simple and flexible connection system for the media to be transported in the micro-reactor system. The micro-reactor system should preferably be compact, easy to operate and adapted to be automated, and the sensor and actuator units for the system control should be readily adaptable to different requirements.

The object is solved by the micro-reactor system for continuous synthesis with the features recited in claim 30. A compact and highly flexible micro-reactor system that can be optimally adapted to the different requirements of the chemical synthesis can be provided by a) constructing the micro-reactor system in a modular fashion, b) assembling a processing unit from processing modules which can be non-positively connected with each other, and c) establishing the fluid connections of the processing unit through the non-positive connection of the processing modules.

In a preferred embodiment of the invention, the non-positive connection between adjacent processing modules can be achieved by connecting elements that are releasably or non-releasably connected with the processing modules and/or with the micro-reactor system, wherein fluid-conducting connections between the processing modules themselves or between the processing modules and external connections of the micro-reactor system can be provided by these connecting elements. With this approach, the fluid connection for the process between the processing modules themselves and with the external connections of the micro-reactor system is safe and always reproducible.

Preferably, support plates are provided which preferably have connection openings and/or integrated connecting elements on the interior sides facing the processing modules. Therefore, the connecting elements are either already a fixed component of the support plates or are placed at a suitable location during assembly of the processing unit. Preferably, an additional holding device transmits the clamping forces required for achieving the non-positive connection to all connecting elements of the connection system. The connecting elements are hereby plastically or elastically deformed so as to provide a reliable seal between the connection openings and the connecting element. The clamping forces can be generated by mechanical, hydraulic, pneumatic and/or electric elements.

The connecting elements for connecting two opposing and preferably circular connection openings are preferably formed as connecting tubes having two ends with respective conical end sections, i.e., the connecting tubes are shaped as a double-cone. Other embodiments can also be envisioned. For example, the connecting elements can have the shape of a bi-pyramid, so that they can be sealingly inserted into four-sided or square connection openings. With these embodiments, the connecting element and the edge of the connection openings contact each other along a line, resulting in large sealing forces and hence a reliable seal.

The connection system also includes sealing elements for completely sealing the connection openings, if there is no fluid medium be transported through these openings. These sealing elements can have the same basic construction as the connecting elements, except that they do not provide a fluid connection. According to another preferred embodiment of the invention, a preferably plate-shaped positioning device is disposed between the processing modules and/or between the processing modules and the support plates, which can be used to align the connecting elements and/or sealing elements relative to the processing modules and/or support plates. This arrangement facilitates positioning and installation as well as removal of individual processing modules.

The connecting elements are preferably fabricated of the same material as the processing modules to reduce the risk of an adverse interaction with the fluid media, reactants and products and to eliminate sealing problems caused by dissimilar thermal expansion coefficients. In particular, they can be made of inert materials, such as metal, glass, ceramic, semiconductor materials or plastic. Large clamping forces can advantageously be tolerated by using harder materials. Preferably, the connecting element is coated with a plastically deformable material or an elastically deformable material, in particular a metal, thus further improving the sealing characteristic.

All potential embodiments of the connecting elements and the sealing elements have in common that very short fluid connections can be realized between the adjacent processing modules or between the processing modules and the connecting plate. Such short fluid connections improve the process reliability of the described micro-reactor system.

The exterior surfaces of the support plates include different connecting sites to provide a fluid connection from the processing units to the periphery, for example feed units for feeding the reactants, withdrawal devices for removing the products or thermostats. A sensor unit can also be associated with the individual modules of the micro-reactor as self-contained exchangeable functional units. The sensor unit includes sensors for acquiring measurement values, such as temperature, pressure, flow, radiation, concentration, distance or viscosity of the medium. In particular, a force sensor can be provided for measuring the clamping forces of the holding device, or a distance sensor can be provided for measuring the distance between the support plates. The synthesis can be regulated or controlled based on the measurement values provided by the sensor unit. A user can control, optionally adjust and also automate particular process flows by using a control unit.

Other preferred embodiments of the invention are recited as additional features in the dependent claims.

Embodiments of the invention will now be described with reference to the appended drawings. It is shown in

EMBODIMENTS

Figure 1:
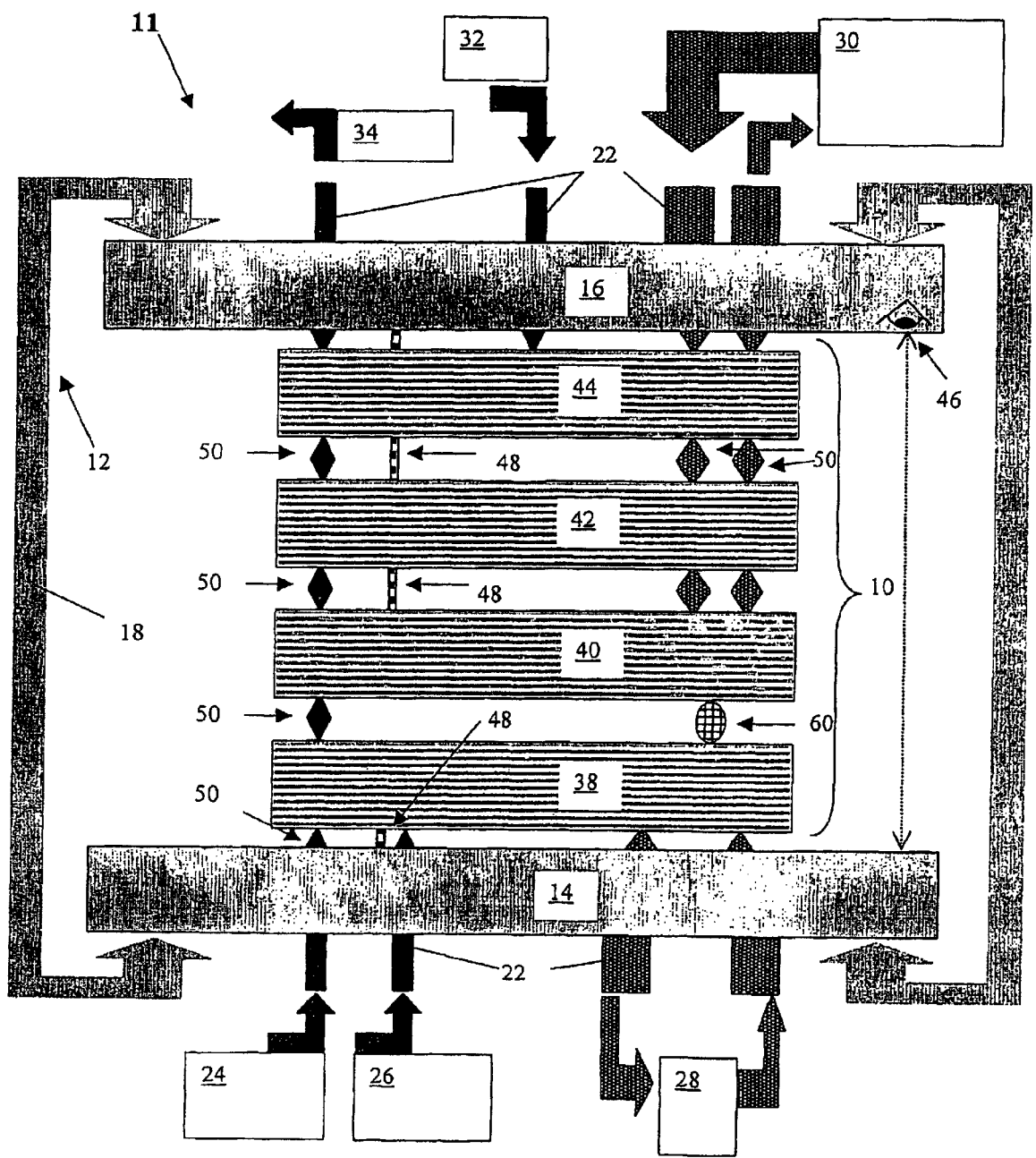
FIG. 1 a block diagram of a micro-reactor system for continuous synthesis, including
 a processing unit (10) with four processing modules,
 connecting elements (50) and sealing elements (60),
 a holding device (12) with a bottom plate and a top plate (14, 16) and a clamping element (18), as well as
 fluid connections for reaction media, (24, 26, 32, 34) and heat carrying media (28:30), and
 sensor unit (46, 48)

FIG. 1 shows schematically a processing unit 10 representing a central component of a micro-reactor system 11 according to the invention for continuous synthesis. The processing unit 10 includes the individual processing modules 38, 40, 42, 44. The processing unit 10 is encompassed by a holding device 12 with two support plates 14, 16 and at least one clamping element 18. The individual processing modules 38, 40, 42, 44 of the processing unit 10 are clamped in the holding device 12 in a manner described below. Preferably, a clamping element 18 is provided to produce uniform clamping forces. The clamping element 18 provides the necessary clamping force for reliably positioning and sealing the processing modules 38, 40,42, 44 by mechanical, hydraulic, pneumatic and/or electrical means.

Connecting sites 22 for providing a fluid connection of the processing unit 10 are provided on the periphery of the support plates 14, 16. In the present example, two feed units are provided for feeding a first and/or second reactant (reactant feed 24, 26). Two thermostats 28: 30 are provided for controlling the temperature of the processing modules 38, 40, 42, 44 by supplying or removing a suitable heat exchange medium. Another connecting site 22 is provided for connecting a feed unit that can introduce an additional medium for post-processing of the reaction mixture (additional medium feed 32). A withdrawal device 34 located in the region of the support plates 16 for removing the products and/or the additional post-processing medium is also schematically indicated.

The various processing modules 38, 40, 42, 44 are typically made of metal (in particular stainless-steel), glass, ceramic, a semiconductor material (in particular silicon-based) or plastic. The materials are selected based on their intended use. An interior surface of the processing modules 38, 40, 42, 44 is micro-mechanically structured in a known fashion, as described for example in EP 1 123 734 A2. At least one channel extending through the system is connected with an inlet and an outlet of the processing modules 38, 40, 42, 44 (connection openings 54). The various reaction spaces cooperate to form the volume in which the desired synthesis is performed. In addition to the channels carrying the reaction media there are provided additional structures that transport, for example, the heat exchange medium received from the thermostats 28, 30 close to the reaction medium. The thermal reaction conditions can be precisely adjusted due to the very small wall thickness between the channels for the heat exchange medium and the reaction medium. In addition, corresponding connection openings 54 in the processing modules 38, 40, 42, 44 have to be provided for the heat exchange medium.

The exemplary processing unit 10 depicted in FIG. 1 includes a total of four processing modules 38, 40, 42, 48. The two reactants are initially fed by the feed units 24, 26 to a first processing module 38, where the two reactants are mixed and react with each other, with the temperature controlled by the thermostat 28. (The design of the processing modules 38 is described, for example, in EP 1 123 734 A2). The reaction medium is introduced via the connection system, which will be described below in more detail, into a second processing module 40 and a third processing module 42, which are used to provide a certain retention time and reaction time for the reaction medium. The reaction time can be adjusted by varying the number of employed processing modules that define the reaction time. The second and third processing module 40 and 42 can also be temperature-controlled by the thermostat 30. A post-processing step is carried out in a following fourth processing module 44, where an additional medium supplied by the feed unit 32 can be mixed with the reaction medium. For example, H.sub.2O can be added to collect reactive intermediate stages by terminating the reaction ("quenching"). Other post-processing steps, such as continuous mixing of a two-phase reaction medium, extraction of by-products, filtration, phase-separation, drying, crystallization, rectification, distillation or absorption are also feasible. The various processing steps can be combined in any way and are designed to operate continuously. The reaction medium is finally removed from the processing unit by the device 34.

Thermal control of the reaction conditions for the continuous synthesis is, of course, not limited—as in the depicted examples—to the region of the processing modules 38, 40, 42, 44, but can also be achieved in the region of the reactant feed 24, 26, the feed 32 for the additional medium, and the withdrawal devices 32, 34 for the product and for the additional medium by using suitable thermostats.

The micro-reactor system 11 includes a sensor unit 62 that is integrated in the holding device 12 and/or provided as a self-contained exchangeable functional unit of the system. Shown here is an exemplary distance sensor 46 which measures the distance between the support plates 14 and 16 and thereby indirectly provides a measurement value with the identity and number of processing modules. A force sensor that is integrated in the holding device 12 monitors the tensioning force. Additional sensors 48 are associated with the individual processing modules 38, 40, 42, 44. These sensors can measure measurement values, such as temperature, pressure, flow, radiation, concentration and the viscosity of the medium. Such sensors 48 are known and will therefore not be described in detail. It should only be kept in mind that the sensors 48 represent completely self-contained and exchangeable functional units that can be associated with the various processing modules 38, 40, 42, 44 depending on the particular requirements.

The connecting system which enables the various media to be fed to and withdrawn from the processing modules 38, 40, 42, 44, is based on conical connecting elements 50. During assembly of the processing unit 10, the geometry of the connecting elements 50 aids in the exact positioning of the individual processing modules 38, 40, 42, 44 and automatically seals the connecting system due to the non-positive connection that is provided by the clamping force produced by the holding device 12.

Figure 2:
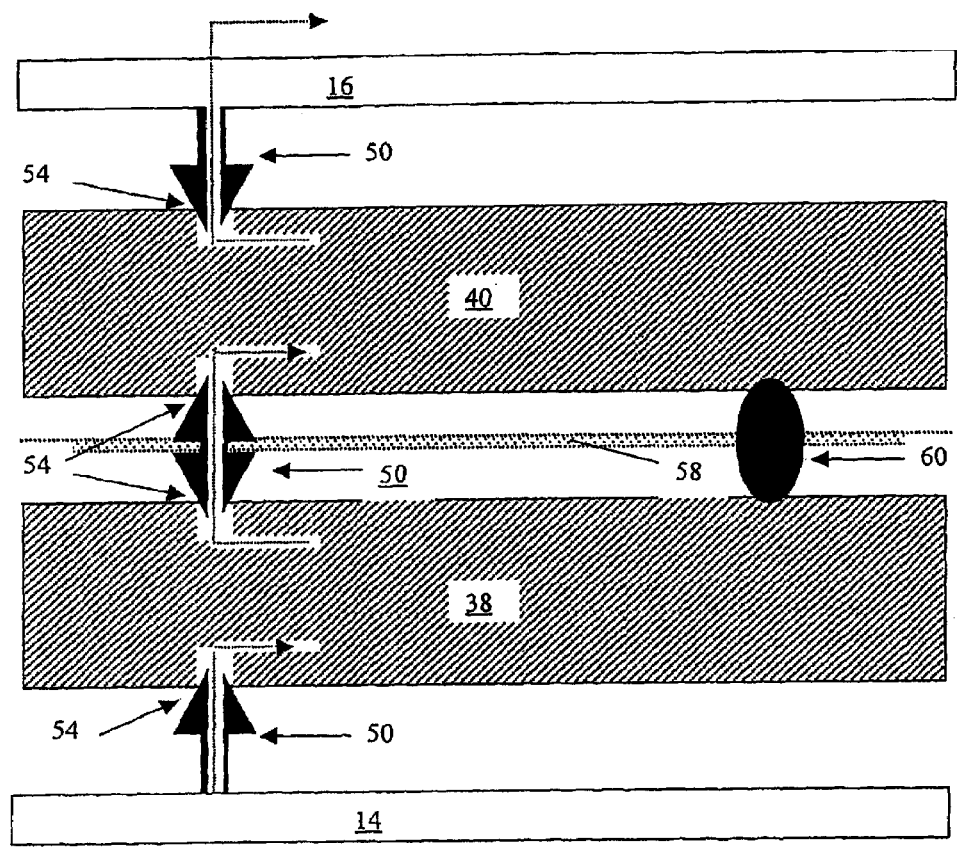
FIG. 2 a schematic cross-sectional view through a processing unit in the region of two processing modules.

For a more detailed understanding of connecting system, FIG. 2 shows a schematic cross-sectional view through a processing unit 10 with only two processing modules 38, 40 for the reaction and retention of the reaction medium. A connecting tube that is integrated in the support plates 14, 16 and has a conical taper in the direction of the processing modules 38, 40, forms the connecting element 50 in the region of the support plates 14, 16. The top and bottom sides of the processing modules 38, 40 include the necessary connection openings 54. A connecting tube having a conical taper on both ends is arranged as a connecting element 50 between the processing modules 38, 40. The fluid reaction medium can enter an exit through the connecting element 50.

It is absolutely necessary that such connection system is leak-tight and flexible. The connecting elements 50 should be made of the same material as the processing modules 38, 40 to eliminate/reduce incompatibilities. In addition, polymeric sealing materials which can corrode in the presence of aggressive reaction media can thereby be eliminated. The connecting sites 22 can be reliably sealed by applying the highest clamping force that can be produced by the holding device 12. Metals, in particular stainless-steel, but also glass, ceramic or plastic can be used. Silicon-based semiconductor materials can also be used. When using very hard materials, an elastic or a plastic deformation of the connecting elements 50 required for sealing can only be generated by applying a very large force. In this case, the connecting elements 50 can advantageously be coated with a softer material, preferably a metal.

With a stacked arrangement of the processing modules, the connecting elements 50 need to bridge only very small distances. By this approach, connections that are not temperature-controlled and that could easily cause crystallization and/or dissociation of thermally unstable materials, can be kept very short. Moreover, dead spaces which adversely affect the characteristic retention time, can be kept extremely small.

A plate-shaped positioning device 58 that holds the connecting element 50 facilitates the relative alignment of the processing modules 38, 40 as well as their installation and removal. For this purpose, the positioning device 58 includes corresponding recesses in which the connecting elements 50 can be inserted. The positioning devices 58 are either made of the same material as the processing modules 38, 40, or have preferably plastically deformable or elastic properties.

If connecting elements 50 are not used between the processing modules, then the device 58 itself can function as a seal between two processing modules. A fluid connection between adjacent processing modules is hereby provided by the openings in the device 58. Optionally, existing recesses can be used to receive the connecting elements 50 as a fluid connection. If only a very small dead space can be tolerated, then the openings must be as small as possible.

If a fluid connection is not to be established between the processing modules, then a sealing element 60 instead of the connecting elements 50 is inserted between the two connection openings 54. For example, as shown in FIG. 1, the heat exchange medium of the thermostats 28, 30 between the processing modules 38, 40 are separated from each other by such sealing element 60. The sealing element 60 also functions as a support element for transmitting the clamping force generated by the holding device 12 as uniformly as possible to the individual processing modules 38, 40, 42, 44.

Figure 3:
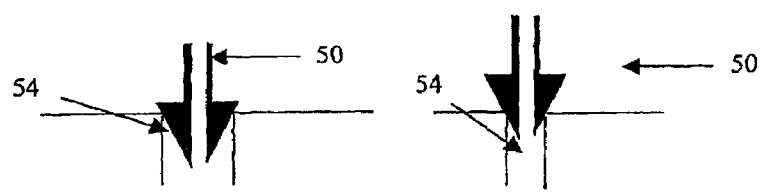
FIG. 3 two schematic cross-sectional views of conical connecting elements of the connection system.

Conical connecting elements 50 can advantageously fittingly engage with connection openings 54 that have different open cross-sections (FIG. 3). Greater manufacturing tolerances of the individual opening cross-sections can thus be tolerated.

Figure 4:
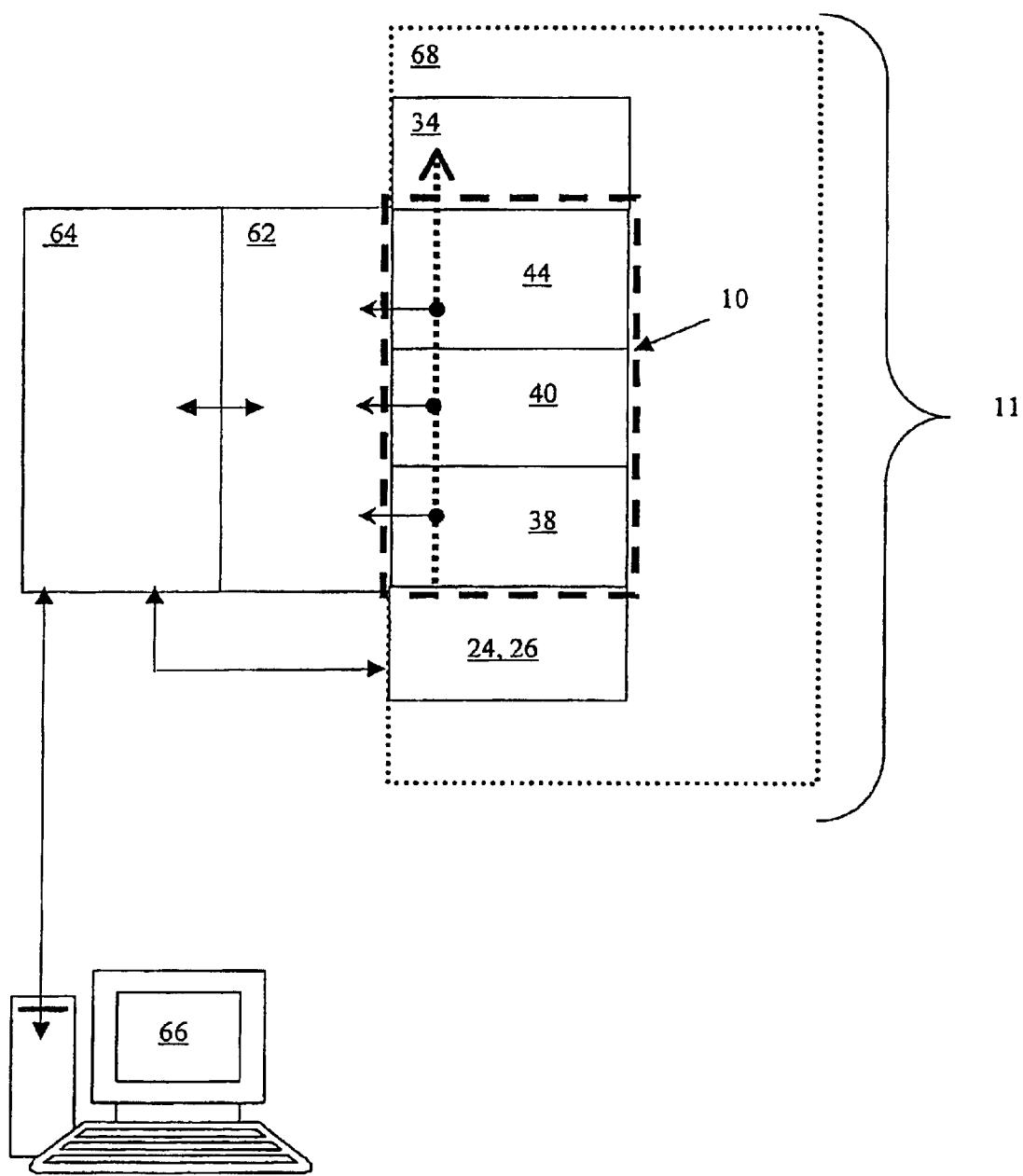
FIG. 4 a schematic diagram of a micro-reactor system with a control unit for a single-stage synthesis.

FIG. 4 shows a schematic diagram of a micro-reactor system 11 which can be used for carrying out a single-stage synthesis under continuous conditions. The processing unit 10 includes a total of three processing modules 38, 40, 44—the first module 38 for mixing and reaction, the second module 40 for retention, and the third module 40 for post-processing. The product is subsequently collected through the withdrawal device 34 in a suitable container. The fluid connection within the processing unit 10 is provided by the aforedescribed connection system with the conical connecting elements 50, as indicated by the dotted arrow.

A sensor unit 62 can be used to measure operating parameters, such as temperature, pressure, concentration of the reactants, flow conditions or the viscosity of the reaction medium. The micro-reactor system also includes an actuator unit 64 with actuators that can be used selectively to change physical states of the reaction medium (temperature, pressure, flow velocity, concentration, phase state, etc.). The entire process flow of the synthesis can therefore be controlled and automated. A control unit 66 with an easily comprehensible user and control interface further simplifies the operation. The control unit 66 can be used to control and optionally set/reset all relevant process parameters. The information network that connects the sensor unit 62, the actuator unit 64 and the control unit 66 is indicated by arrows. In an automated environment, the number or type of the employed processing modules 38, 40, 44 can be determined with a distance sensor 46 (as with the processing unit 10 depicted in FIG. 1), which then also allows determination of the entire internal reaction and retention volume of the processing unit 10. A desired retention time can be obtained by automatically control the flow velocity. Performing purge cycles for cleaning the processing unit 10 can also be a part of the automation. The temperature of the individual processing modules 38, 40, 44 of the processing unit 10 as well as of the withdrawal device 34 and the reactant feeds 24, 26 can be individually controlled by employing suitable thermostats. The temperature-controllable region 68 is indicated by a dotted border.

Figure 5:
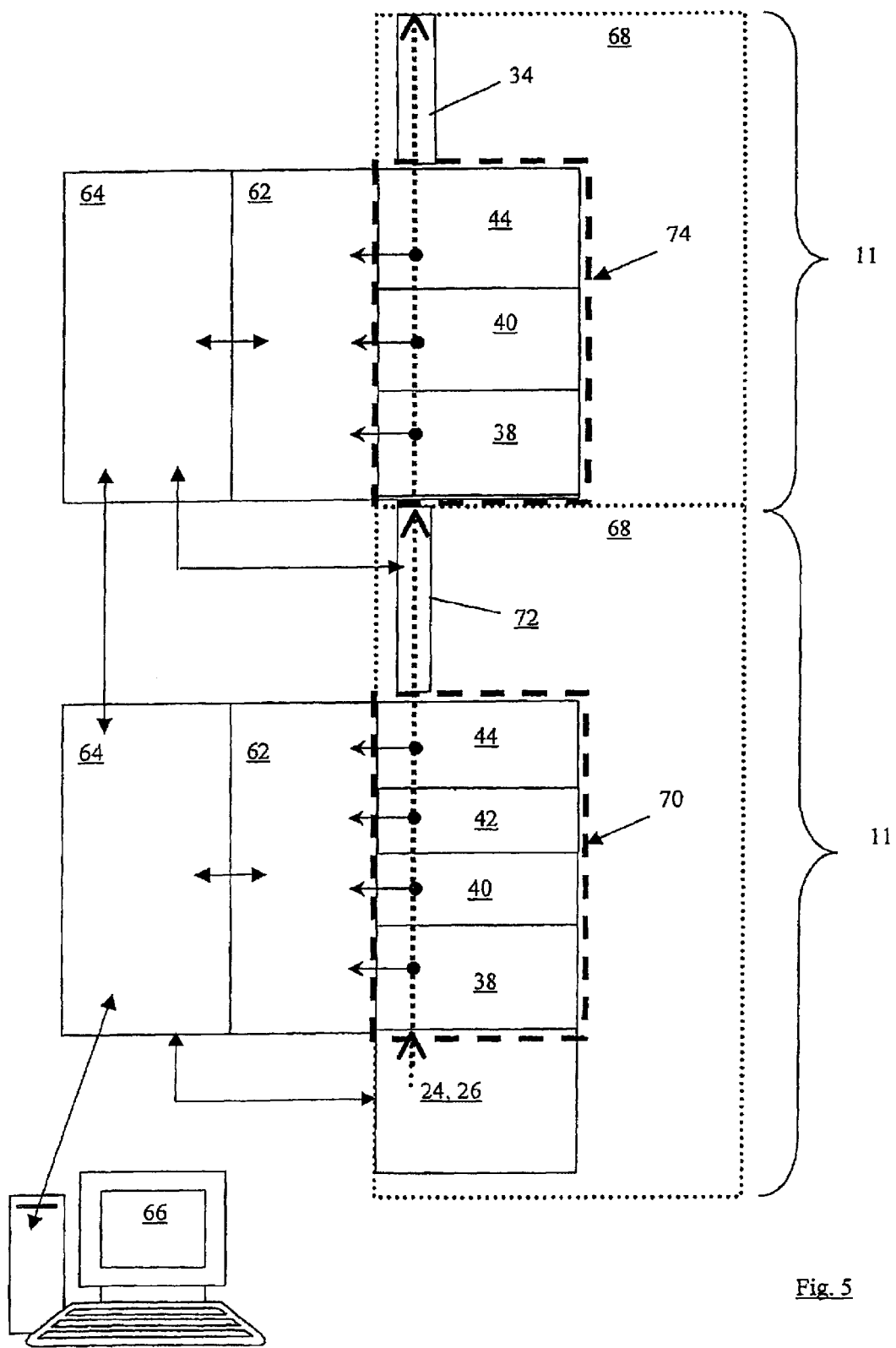
FIG. 5 a schematic diagram of a device for a two-stage synthesis with two micro-reactor systems and a control unit.

If two-stage or multistage syntheses are to be performed, then several micro-reactor systems 11 can be connected in series and also connected with a control unit 66. FIG. 5 shows such a micro-reactor system for a two-stage synthesis. A first processing unit 70 supplies an intermediate product which is fed with an additional reactant via a suitable device 72 into a second processing unit 74. After a reaction between the intermediate product and the additional reactants and post-processing of the reaction medium, the desired end product can be collected with the withdrawal device 34. The various processing units 70, 74 of these micro-reactor systems can each be equipped with exemplary processing modules 38, 40, (42 in stage 1), 44, and with a self-contained sensor unit 62 and actuator unit 64. The entire reaction chain can be monitored, controlled and operated centrally from the control unit 66.

| List of reference characters | |
|---|---|
| 10 | processing unit |
| 11 | micro-reactor system |
| 12 | holding device |
| 14, 16 | support plates |
| 18 | clamping element |
| 22 | connecting site |
| 24, 26 | reactant feed |
| 28, 30 | thermostats |
| 32 | additional medium feed |
| 34 | withdrawal device for the product |
| 38 | processing module for the reaction |
| 40 | first processing module for providing retention/reaction time |
| 42 | second processing module for providing retention/reaction time |
| 44 | processing module for post-processing |
| 46 | distance sensor |
| 48 | additional sensors |
| 50 | connecting elements |
| 54 | connection openings |
| 58 | positioning device |
| 60 | sealing element |
| 62 | sensor unit |
| 64 | actuator unit |
| 66 | control unit |
| 68 | temperature-controllable region |
| 70 | first processing unit |
| 72 | device for temperature-controllable fluid connection between the withdrawal device of a first and a second reaction stage |
| 74 | second processing unit |

The invention claimed is:

1. A micro-reactor system (11) for continuous synthesis, providing defined reaction spaces and conditions for the synthesis, wherein the micro-reactor system (11) comprises
   (a) a processing unit (10) assembled from processing modules (38, 40, 42, 44) which can be connected with one another via a non-positive connection, and
   (b) fluid connections between adjacent processing modules (38, 40, 42, 44), which can be achieved by the non-positive connection of the processing modules (38, 40, 42, 44),
   wherein
      the fluid connections are formed by fluid-carrying connecting elements (50), with two ends of the fluid-carrying connecting elements being insertable in suitable connection openings (54) of two adjacent processing modules (38, 40, 42, 44) for transporting fluid media through the processing modules, wherein the non-positive connection of the processing modules (38, 40, 42, 44) is essentially provided by friction forces between the two ends of the fluid-carrying connecting elements and the suitable connecting openings (54) of the two adjacent processing modules (38, 40, 42, 44).

2. The micro-reactor system (11) according to claim 1, wherein the connecting elements (50) have an exterior cross-section that is tapered on one end or on both ends.

3. The micro-reactor system (11) according to claim 2, wherein the connecting elements (50) for connecting two opposing, circular connection openings (54) are formed as connecting tubes having a conical taper on both ends.

4. The micro-reactor system (11) according to claim 2, wherein the connecting elements (50) contact an edge of the connection openings (54) along a line.

5. The micro-reactor system (11) according to claim 1, wherein the connecting elements (50) are releasably connected with the processing modules (38, 40, 42, 44).

6. The micro-reactor system according to claim 1, wherein the non-positive connection is implemented via mechanical, hydraulic, pneumatic and/or electrical elements.

7. The micro-reactor system according to claim 1, wherein the processing unit (10) is fitted in a holding device (12).

8. The micro-reactor system according to claim 7, wherein the holding device comprises at least two support plates (14, 16), between which the processing modules (38, 40, 42, 44) can be clamped.

9. The micro-reactor system according to claim 7, wherein the at least two support plates (14, 16) have connection openings (54) and/or integrated connecting elements (50) on their inside facing the processing modules (38, 40, 42, 44), and that the connecting elements (50) in conjunction with corresponding connection openings 54 disposed on the top side and/or bottom side of the processing modules (38, 40, 42, 44) are capable of establishing a fluid connection.

10. The micro-reactor system according to claim 1, wherein the connecting elements (50) can be positioned between the processing modules by using a positioning device (58).

11. The micro-reactor system according to claim 10, wherein the positioning device (58) itself is used for sealing the fluid connection between two processing modules.

12. The micro-reactor system according to claim 10, wherein the positioning device (58) is made of a plastically deformable or an elastic material.

13. The micro-reactor system according to claim 1, wherein the connecting elements (50) are formed of a metal, in particular stainless steel.

14. The micro-reactor system according to claim 1, wherein the connecting elements (50) are formed of glass, ceramic or semiconductor materials.

15. The micro-reactor system according to claim 1, wherein the connecting elements (50) are made of plastic.

16. The micro-reactor system according to claim 1, wherein the connecting elements (50) formed on the basis of hard materials are coated with a plastically deformable material or an elastically deformable material.

17. The micro-reactor system according to claim 1, wherein the connecting elements (50) are made of the same material as the processing modules (38, 40, 42, 44).

18. The micro-reactor system according to claim 1, wherein the connecting system includes sealing elements (60) for completely sealing the connection openings (54).

19. The micro-reactor system according to claim 10, wherein the positioning device (58) is formed in particular as a plate and is arranged between the processing modules (38, 40, 42, 44) and/or between the processing modules (38, 40, 42, 44) and the support plates (14, 16).

20. The micro-reactor system according to claim 19, wherein the positioning device (50) can be used to align the connecting elements (50) and/or sealing elements (60) relative to the processing modules (38, 40, 42, 44) and/or the support plates (14, 16), respectively.

21. The micro-reactor system according to claim 8, wherein the exterior sides of the support plates (14, 16) include connecting sites (22) for a peripheral device, wherein the peripheral device is a reactant feed (24, 26), a withdrawal device for the product (34), or a thermostat (28, 30).

22. The micro-reactor system according to claim 1, wherein the micro-reactor system includes a sensor unit (62) as a self-contained interchangeable functional unit.

23. The micro-reactor system according to claim 22, wherein the sensor unit (62) includes sensors (40) for acquiring at least one temperature, pressure, flow, radiation, concentration, distance or viscosity measurement value.

24. The micro-reactor system according to claim 1, further comprising:
a force sensor for measuring a clamping force of the holding device (12).

25. The micro-reactor system according to claim 1, further comprising:
a distance sensor (46) for measuring a distance between the support plates (14, 16).

26. The micro-reactor system according to claim 1, wherein the micro-reactor system includes a control unit (66) for monitoring, operating, regulating and/or controlling the synthesis process flow.

27. The micro-reactor system according to claim 1, wherein the micro-reactor system includes at least two processing units (70, 72) connected in parallel and/or in series.

28. The micro-reactor system according to claim 1, wherein two or more processing units that can be individually provided with processing modules can be connected successively in series, so that the fluid flow of the entire reaction chain can be centrally monitored, controlled, regulated and/or operated from one control unit (66).

29. A method comprising the steps of:
conducting a chemical reaction in the micro-reactor system according to claim 1.

30. The micro-reactor system according to claim 8, further comprising:
fluid connections between the processing modules (38, 40, 42, 44) and the at least two support plates (14,16).

31. A micro-reactor system (11) for continuous synthesis, providing defined reaction spaces and conditions for the synthesis, wherein the micro-reactor system (11) comprises
(a) a processing unit (10) assembled from processing modules (38, 40, 42, 44) which can be connected with one another via a non-positive connection, and
(b) fluid connections between adjacent processing modules (38, 40, 42, 44), which can be achieved by the non-positive connection of the processing modules (38, 40, 42, 44),
wherein
the fluid connections are formed by fluid-carrying connecting elements (50), with two ends of the fluid-carrying connecting elements being insertable in suitable connection openings (54) of two adjacent processing modules (38, 40, 42, 44) for transporting fluid media through the processing modules, wherein the non-positive connection of the processing modules (38, 40, 42, 44) is essentially provided by friction forces between the two ends of the fluid-carrying connecting elements and the suitable connecting openings (54) of the two adjacent processing modules (38, 40, 42, 44), wherein the connecting elements (50) have an exterior cross-section that is tapered on one end or on both ends and contact an edge of the connection openings (54) along a line.

* * * * *